(12) United States Patent
Gerhardt et al.

(10) Patent No.: US 10,924,036 B2
(45) Date of Patent: Feb. 16, 2021

(54) POWER GENERATION DEVICE AND A POWER GENERATION METHOD

(71) Applicant: KONINKLIJKE PHILIPS N.V., Eindhoven (NL)

(72) Inventors: Lutz Christian Gerhardt, Eindhoven (NL); Alan James Davie, Eindhoven (NL); Mark Thomas Johnson, Eindhoven (NL); Hans Kroes, Eindhoven (NL); Neil Francis Joye, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 425 days.

(21) Appl. No.: 15/756,994

(22) PCT Filed: Sep. 5, 2016

(86) PCT No.: PCT/EP2016/070871
§ 371 (c)(1),
(2) Date: Mar. 2, 2018

(87) PCT Pub. No.: WO2017/037291
PCT Pub. Date: Mar. 9, 2017

(65) Prior Publication Data
US 2019/0058419 A1     Feb. 21, 2019

(30) Foreign Application Priority Data

Sep. 4, 2015   (EP) .................................. 15183818

(51) Int. Cl.
*H02N 1/04*     (2006.01)
(52) U.S. Cl.
CPC ..................................... *H02N 1/04* (2013.01)

(58) Field of Classification Search
CPC ....................................................... H02N 1/04
(Continued)

(56) References Cited

U.S. PATENT DOCUMENTS 7,525,205 B2 *   4/2009   Mabuchi ............... B60C 23/041
                                                      290/1 R
2004/0207369 A1   10/2004   Landolt
(Continued)

FOREIGN PATENT DOCUMENTS

CN       103780127 A      5/2014
CN       104578669 A      4/2015
(Continued)

OTHER PUBLICATIONS

Wang et al "Triboelectric Nanogenerators as Self-Powered Active Sensors" Nano Energy 11, (2015) p. 436-462.
(Continued)

*Primary Examiner* — Terrance L Kenerly (57) ABSTRACT

The invention provides a power generation device comprising at least two generating arrangements, each adapted to generate a voltage output through the relative motion of two differently charged generating elements, the generating elements having some separation distance (which may be zero or non-zero). The arrangements are co-operatively configured in such a way that the separation distances between their respective elements are reciprocally related: an increase in one leads to a related decrease in the other. By combining these two signal outputs, a single voltage, current or power output may be provided in a self-regulating manner by the device whose amplitude is substantially independent of any changes or variations in the separation distance between elements of either of the two arrangements.

24 Claims, 6 Drawing Sheets

(58) Field of Classification Search
USPC .................................................. 310/309, 310
See application file for complete search history.

(56) References Cited

U.S. PATENT DOCUMENTS

| | | | |
|---|---|---|---|
| 2014/0085914 A1 | 3/2014 | Liao | |
| 2014/0225475 A1* | 8/2014 | Kim | H02N 11/002 310/309 |
| 2014/0246951 A1* | 9/2014 | Wang | H02N 1/04 310/310 |
| 2014/0292138 A1 | 10/2014 | Wang et al. | |
| 2015/0035408 A1 | 2/2015 | Despesse et al. | |
| 2015/0236619 A1 | 8/2015 | Hattori et al. | |

FOREIGN PATENT DOCUMENTS

| | | |
|---|---|---|
| CN | 104779831 A | 7/2015 |
| CN | 104868777 A | 8/2015 |
| JP | 2012152010 A | 8/2012 |
| JP | 2013198314 A1 | 9/2013 |

OTHER PUBLICATIONS

Wang "Triboelectric Nanogenerators as New Energy Technolgoy for Self Powered Systems and as Active Mechanical and Chemical Sensors" ACS Nano 7.11 (2013) p. 9533-9557.

Bai et al "Integrated Multilayred Triboelectric Nanogenerator for Harvesting Biomechanical Energy From Human Motions" ACS Nano 2013 7(4) pp. 3713-3719.

Wang et al "Freestanding Triboelectric Layer Based Nanogenerators for Harvesting Energy From a Moving Object of Human Motion in Contact and Non-Contact Modes" Adv. Mater. 2014 26, p. 2818-2824.

Yang et al "Single Electrode Based Sliding Triboelectric Nanogenerator for Sel-Powered Displacement Vector Sensor System", ACS Nano 7.8 (2013) p. 7342-7351.

Lin et al "Segmentally Structured Disk Triboelectric Nanogenerator for Harvesting Rotational Mechanical Energy", Nano Letters, 2013 13(6) p. 2916-2923.

A.F. Diaz and R.M. Felix-Navarro, "A semi-quantitative triboelectric series for polymeric materials:the influence of chemical structure and properties", Journal of Electrostatics 62 (2004) 277-290.

Chen et al "Harvesting vibration energy by a triple-cantilever based triboelectric nanogenerator" Nano Research vol. 6, (12) 2013 p. 880-886.

Yang et al "3D Stack Integrated Triboelectric Nanogenerator for Harvesting Vibration Energy" Adv. Funct. Mater. 2014 vol. 24, p. 4090-4096.

Lin et al "Non-Contact Free-Rotating Disk Triboelectric Nanogenerator as a Sustainable Energy Harvester and Self-Powered Mechanical Sensor" ACS Appl. Mater. Interfaces 2014 6, p. 3031-3038.

Lin et al "Robust Triboelectric Nanogenerator Based on Rolling Electrification and Electrostatic Induction at an Instantaneous Energy Conversion Efficiency of 55%" ACS Nano (2015).

Seol et al "Vertically Stacked Thin Triboelectric Nanogenerator for Wind Energy Harvesting" Nano Energy (2014), http://dx.doi.org/10.1016/j.nanoen 2014.11.016.

Zhang et al., Theoretical Comparison, Equivalent Transformation, and Conjunction Operations of Electromagnetic Induction Generator and Triboelectric Nanogenerator for Harvesting Mechanical Energy, Advanced Materials, 2014, vol. 26, Issue 22, pp. 3580-3591.

G. Zhu et al, "Radial-arrayed rotary electrification for high performance triboelectric generator", Nature Communications 5, (2014).

Yannan Xie et al., Multi-layered disk triboelectric nanogenerator for harvesting hydropower, Nano Energy, 2014,6, 129-136.

Chang Bao Han et al., High Power Triboelectric Nanogenerator Based on Printed Circuit Board (PCB) Technology, Nano Research, 2014, in press/available online.

* cited by examiner

POWER GENERATION DEVICE AND A POWER GENERATION METHOD

CROSS-REFERENCE TO PRIOR APPLICATIONS

This application is the U.S. National Phase application under 35 U.S.C. § 371 of International Application No. PCT/EP2016/070871, filed on Sep. 5, 2016, which claims the benefit of EP Patent Application No. EP 15183818.2, filed on Sep. 4, 2015. These applications are hereby incorporated by reference herein.

FIELD OF THE INVENTION

This invention relates to a power generation device and method; in particular to a device and method adapted to convert mechanical energy into electrical energy.

BACKGROUND OF THE INVENTION

The harvesting or conversion of small-scale sources of mechanical energy into usable forms of electrical energy is an area which has attracted significant attention in recent years, and, as a technology field, has undergone rapid and substantial development.

One field in particular which has been the focus of much attention is that of triboelectric energy generation. The triboelectric effect (also known as triboelectric charging) is a contact-induced electrification in which a material becomes electrically charged after it is contacted with a different material through friction. Triboelectric generation is based on converting mechanical energy into electrical energy through methods which couple the triboelectric effect with electrostatic induction. It has been proposed to make use of triboelectric generation to power wearable devices such as sensors and smartphones by capturing the otherwise wasted mechanical energy from such sources as walking, random body motions, the wind blowing, vibration or ocean waves (see, for example: Wang, Sihong, Long Lin, and Zhong Lin Wang. "Triboelectric nanogenerators as self-powered active sensors." *Nano Energy* 11 (2015): 436-462).

In its simplest form, a triboelectric generator uses two sheets of dissimilar materials, one an electron donor, the other an electron acceptor. One or more of the materials can be an insulator. Other possible materials may include semiconductor materials, for example silicon comprising a native oxide layer. When the materials are brought into contact, electrons are exchanged from one material to the other, inducing a reciprocal charge on the two materials. This is the triboelectric effect.

If the sheets are then separated, each sheet holds an electrical charge (of differing polarity), isolated by the gap between them, and an electric potential is built up. If electrodes are disposed on to the two material surfaces and an electrical load connected between them, any further displacement of the sheets, either laterally or perpendicularly, will induce in response a current flow between the two electrodes. This is simply an example of electrostatic induction. As the distance between the respective charge centres of the two plates is increased, so the attractive electric field between the two, across the gap, weakens, resulting in an increased potential difference between the two outer electrodes, as electrical attraction of charge via the load begins to overcome the electrostatic attractive force across the gap.

In this way, triboelectric generators convert mechanical energy into electrical energy through a coupling between two main physical mechanisms: contact electrification (tribo-charging) and electrostatic induction.

By cyclically increasing and decreasing the mutual separation between the charge centres of the plates, so current can be induced to flow back and forth between the plates in response, thereby generating an alternating current across the load.

Recently, an emerging material technology for power generation (energy harvesting) and power conversion has been developed which makes use of this effect, as disclosed in Wang, Z. L., "Triboelectric nanogenerators as new energy technology for self-powered systems and as active mechanical and chemical sensors." *ACS nano* 7.11 (2013): 9533-9557. Based on this effect several device configurations have been developed of so-called triboelectric generators ("TEGs") or triboelectric nanogenerators ("TENGs"). Triboelectric nanogenerators constitute one subset of triboelectric generators, and are characterised by certain specific surface properties of the generator plates.

Since their first reporting in 2012, the output power density of TEGs has been greatly improved. The volume power density may reach more than 400 kilowatts per cubic metre, and an efficiency of ~60% has been demonstrated (ibid.). In addition to high output performance, TEG technology carries numerous other advantages, such as low production cost, high reliability and robustness, and low environmental impact.

The TEG may be used as an electrical power generator, i.e. energy harvesting from, for example, vibration, wind, water, random body motions or even conversion of mechanically available power into electricity. The generated voltage is a power signal.

TEGs may broadly be divided into four main operational classes.

A first mode of operation is a vertical contact-separation mode, in which two or more plates are cyclically brought into or out of contact by an applied force. This may be used in shoes, for example, where the pressure exerted by a user as they step is utilised to bring the plates into contact. One example of such a device has been described in the article "Integrated Multilayered Triboelectric Nanogenerator for Harvesting Biomechanical Energy from Human Motions" of Peng Bai et. al. in ACS Nano 2013 7(4), pp 3713-3719. Here, the device comprises a multiple layer structure formed on a zig-zag shaped substrate. The device operates based on surface charge transfer due to contact electrification. When a pressure is applied to the structure, the zig-zag shape is compressed to create contact between the different layers, and the contact is released when the pressure is released. The energy harvested might be for example used for charging of mobile portable devices.

A second mode of operation is a linear sliding mode, wherein plates are induced to slide laterally with respect to one another in order to change the area of overlap between them. A potential difference is induced across the plates, having an instantaneous magnitude in proportion to the rate of change of the total overlapping area. By repeatedly bringing plates into and out of mutual overlap with one another, an alternating current may be established across a load connected between the plates.

One particular subset of linear sliding mode TEGs which have been developed are rotational disk TEGs which can be operated in both a contact (i.e., continuous tribo-charging and electrostatic induction) or a non-contact mode (i.e., only electrostatic induction after initial contact electrification). Rotational disc TEGs typically consist of at least one rotor and one stator each formed as a set of spaced circle sectors (segments). The sectors overlap and then separate as the two discs rotate relative to each other. As described above, a current may be induced between two laterally sliding—oppositely charged—layers, with a magnitude in proportion to the rate of change of the area of overlap. As each consecutively spaced sector of the rotor comes into and then out of overlap with a given stator sector, so a current is induced between the two sector plates, initially in a first direction, as the plates increase in overlap, and then in the opposite direction as the plates decrease in overlap.

A design which enables energy to be harvested from sliding motions is disclosed in the article "Freestanding Triboelectric-Layer-Based Nanogenerators for Harvesting Energy from a Moving Object of Human Motion in Contact and Non-Contact Modes" in Adv. Mater. 2014, 26, 2818-2824. A freestanding movable layer slides between a pair of static electrodes. The movable layer may be arranged not to make contact with the static electrodes (i.e. at small spacing above the static electrodes) or it may make sliding contact.

A third mode of operation is a single electrode mode in which one surface is for example grounded—for example, a floor road—and a load is connected between this first surface and ground (see for example Yang, Ya, et al. "Single-electrode-based sliding triboelectric nanogenerator for self-powered displacement vector sensor system."*ACS nano* 7.8 (2013): 7342-7351.) The second surface—not electrically connected to the first—is brought into contact with the first surface and tribo-charges it. As the second surface is then moved away from the first, the excess charge in the first surface is driven to ground, providing a current across the load. Hence only a single electrode (on a single layer) is used in this mode of operation to provide an output current.

A fourth mode of operation is a freestanding triboelectric layer mode, which is designed for harvesting energy from an arbitrary moving object to which no electrical connections are made. This object may be a passing car, passing train, or a shoe, for example. (Again, see "Triboelectric nanogenerators as new energy technology for self-powered systems and as active mechanical and chemical sensors.", *ACS nano* 7.11 (2013): 9533-9557).

There are still further designs of triboelectric generator, such as a double-arch shaped configuration based on contact electrification. A pressure causes the arches to close to make contact between the arch layers, and the arches returns to the open shape when the pressure is released. A triboelectric generator has also been proposed which is formed as a harmonic resonator for capturing energy from ambient vibrations.

As mentioned, rotational disk TEGs, and indeed linear sliding mode TEGs in general, can be operated in both a contact mode and a non-contact mode. Although contact is desired to tribo-charge the plates (both initially and also subsequently, to counteract leakage) the electrostatic induction process itself (by means of which the electrical energy is generated) does not require contact between the plates, but operates well with a small plate separation (of, for example, approximately 0.5 mm—see for example Long Lin et al., Segmentally Structured Disk Triboelectric Nanogenerator for Harvesting Rotational Mechanical Energy, *Nano Letters,* 2013, 13 (6), 2916-2923).

Operating in a contact mode—wherein the plates are maintained in continual frictional contact—results in a higher power output, since the plates are being continually charged, and hence continually maintained at some theoretical maximal surface charge density by continual replacement of charge lost through leakage etc. However, operating in contact mode brings with it various difficulties, including excess noise production and deterioration of device materials (and consequently device life-time) through surface abrasion. In most cases, therefore, it preferable to induce contact between the plates only intermittently, for tribo-charging when this is necessary, and then operate in a non-contact mode, in order to overcome the described difficulties with noise, friction and device-lifetime.

However, such bi-mode operation brings with it new difficulties, arising from the fact that the separation distance between the generator plates during electrostatic induction has a very strong effect on the voltage and power amplitude of the generated electrical output. As a result, the intermittent charging of the plates, which requires frequent repositioning between a contact arrangement and a separated arrangement, results in a non-uniform power and voltage output over the course of the generator's operation. The initiation of each tribo-charging phase leads to a temporary or transient increase in power output as the plates are brought close to one another, and each return to non-contact mode leads to an equivalent reduction in power output. When utilising the generator to drive an electrical component, such non-uniformity in output is clearly not ideal.

Figure 1:
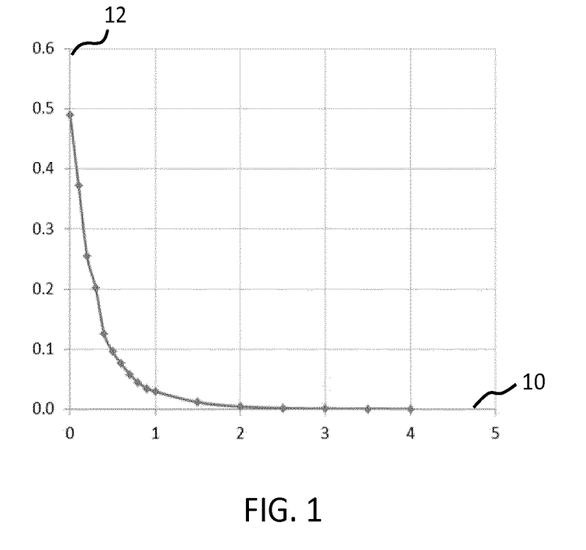
FIG. 1 shows a graph illustrating the relationship between peak power output and plate separation for an example rotating disk triboelectric generator.

By way of illustration, the graph of FIG. 1 represents a measured relationship between plate separation in mm (x-axis 10) and peak power output in mW (y-axis 12) for an example rotating plate TEG comprising a PTFE rotor. As discussed above, power output is greatest when the plates are in contact (i.e. zero plate separation), reaching a peak output for the example rotor measured for FIG. 1 of approximately 0.5 mW. As plate separation is increased, peak power output falls sharply, with a separation of just 0.5 mm incurring a near 80% output reduction, peak power falling to just 0.1 mW. For a particular rotating disk TEG device type, at a separation of 2 mm, power output has fallen to almost zero.

Figure 2:
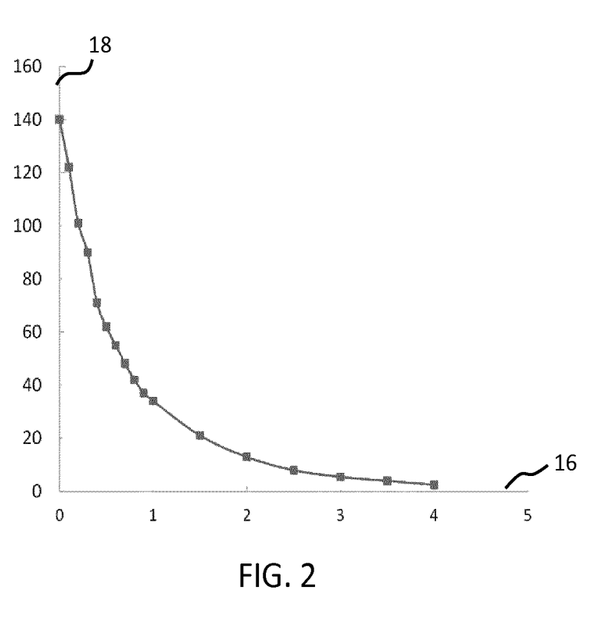
FIG. 2 shows a graph illustrating the relationship between peak-to-peak output voltage and plate separation for an example rotating disk triboelectric generator.

Similarly, FIG. 2 illustrates the relationship, for the same example TEG, between plate separation in mm (x-axis 16) and peak-to-peak amplitude of the output voltage in V (y-axis 18). Once again, a sharp decline is observed in response to increased plate separation, with a gap of 1 mm incurring a reduction in peak-to-peak voltage of approximately 75% (from ~140V to ~35V).

This strong relationship between plate separation distance and peak power output holds not just for the example triboelectric generators represented by the graphs of FIGS. 1 and 2, but for all varieties of electrical generator which generate power according to similar principles of electrostatic induction. Small variations in separation distance between the plates, which may be caused not only through deliberately induced changes—such as when charging plates of a TEG—but also through external environmental influences or misalignment due to device assembly errors or manufacturing intolerances (e.g. flatness, roughness), lead to fluctuations in generated power output.

Hence there is a need to provide an energy generation (or power conversion) device, operating according to these principles, but wherein the device is configured such that the generated power output is less critically dependent upon the separation distance between moving plate elements.

SUMMARY OF THE INVENTION

The invention is defined by the claims.

According to an aspect of the invention, there is provided a power generation device, comprising:

an electrical power generator, the generator comprising a first and second generating arrangement, each arrangement configured to generate an output voltage and/or current, and each using at least a first generating element and a second generating element, at least one of which is adapted to have a state of charging, and which are adapted to be moveable with respect to one another in order to generate a resultant output voltage and/or current, the output voltage and/or current being dependent upon a separation distance between the first and second generating element, wherein the generating arrangements are co-operatively configured such that an increase in the separation distance between generating elements of the first arrangement results in a related decrease in the separation distance between generating elements of the second arrangement, and vice versa, and wherein the electrical power generator further comprises a combiner unit adapted to combine the output voltages and/or currents of the first and second generating arrangements in order to generate a combined electrical output signal from the electrical power generator.

Embodiments of the invention hence provide a power generator comprising at least two different generating arrangements, each adapted to generate a separate current and/or voltage output through the relative motion of two charged generating elements, the generating elements having some separation distance (which may be zero or non-zero). The arrangements are co-operatively configured in such a way that the separation distances between their respective elements are reciprocally related: an increase in one leads to a related decrease in the other.

By combining these two outputs, a single current or voltage output may be provided whose amplitude is substantially independent of any changes or variations in the separation distance between elements of either of the two arrangements. In this manner, the coupled contributions of the two independent voltages compensate voltage variations and add up to relatively constant output regardless of the separation distance of the plates and position of the configured elements to each other.

Note in the context of the present invention, a generating element is to be understood to mean an element, component or constituent of the device, for use in power generation. The generating element may in examples comprise a single isolated part, such as a single electrode or surface section, or may in further examples comprise a collection, arrangement or assembly of parts, such as a pattern or grouping of electrodes or surface portions, which form a collective unit for use in power generation within the device.

Furthermore, in examples, the first and second generating arrangements may each comprise a separate pair of first and second generating elements for their dedicated use, or may alternatively share one or both of a common pair of first and second generating elements.

In examples, more than two generating arrangements may be provided.

According to one example set of embodiments, the electrical power generator comprises a first, second and third generating member, at least the third configured to be moveable with respect to the first and second, and wherein the first generating member comprises the first generating element of the first generating arrangement, the second generating member comprises the first generating element of the second generating arrangement, and the third generating member comprises the second generating elements of both the first generating arrangement and the second generating arrangement.

Within these embodiments, three generating members are provided, with the first and third electrostatically coupling to provide the first generating arrangement, and the second and third electrostatically coupling to provide the second generating arrangement.

In examples, the generating members may comprise generator plates, the generator plates having generating elements disposed on one or more surfaces.

The third generating member may be positioned between the first and second, and configured to be moveable along an axis running between the two.

In this case, the first or second generating elements of the first arrangement may be disposed on one side of the third member, and the first or second generating elements of the second arrangement disposed on the alternate side of the third member. Motion of the third member therefore induces relative motion between the respective pairs of generating elements of both the first and second generating arrangements.

Furthermore, according to this arrangement, the displacement of the third member relative to the first and second is inherently reciprocal between the two: moving closer to one, takes it further away from the other.

Figure 5A:
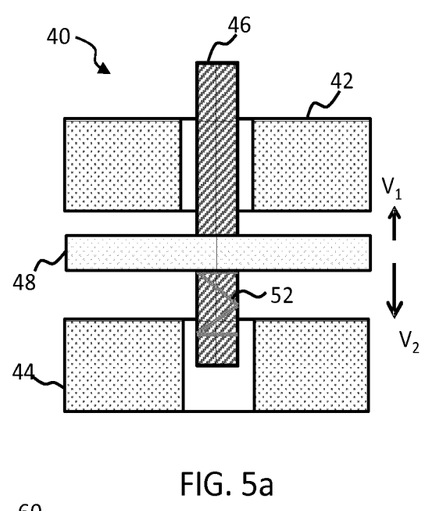
FIGS. 5a and 5b schematically depict a second example generator device.
Figure 5B:
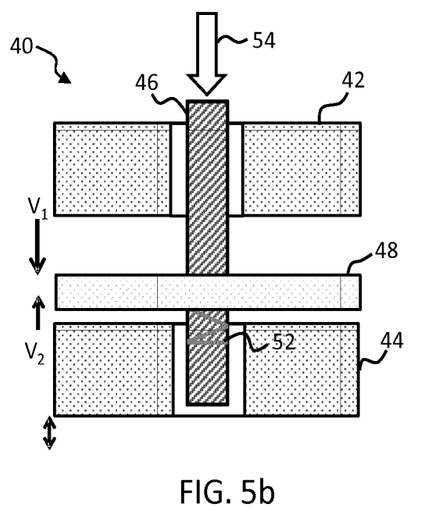

In examples, the position of the third generating member along said axis may be controlled in dependence upon the application of an external force (e.g. make use of bearing play in FIGS. 5/6)

The third generating member may be coupled to a carrier, the carrier being displaceable along the directions of the axis, thereby allowing movement of the third member along the axis between the first and the second members. The carrier may, for example, comprise a shaft, rod, spindle or other support means.

The carrier may have a longitudinal axis, arranged in alignment with the axis running between the first and second members. In some particular examples, the carrier may be arranged and adapted such that application of a force along the direction of said longitudinal axis can induce displacement of the third member along the axis running between the first and second members.

The displacement of the carrier may be spring biased in one direction along the axis. In this way, according to one or more examples, any external force applied to the carrier (for example to induce displacement) against this direction is elastically resisted. In addition, the spring bias may in some cases be configured so as to push the third generating member in the direction of either the first or second member.

According to one or more embodiments, the generating elements of each of the first and second generating arrangements may each comprise respective sets of one or more chargeable surface regions.

In one set of examples, the first, second and third generating members comprise respective disk elements, the third being rotatable with respect to the first and second, or vice versa, in order thereby to generate one or more output voltages and/or currents.

The device may further comprise a controller unit, the controller unit adapted to control the position of the third member along the axis running between the first and second members.

The controller may for example be adapted to induce intermittent periods of contact between the third member and the first and/or second members, to thereby induce contact between the first and second generating elements of the first and/or second generating arrangements.

According to one particular set of examples, the controller may be adapted to cyclically move the third member back and forth between the first and the second members. This may for example facilitate intermittent periods of tribo-charging in the case that the provided power generator is a triboelectric power generator.

When the power generator is a triboelectric power generator, the controller may be conveniently used to induce and control intermittent periods of tribo-charging of the plates of the generator.

The combiner unit may be adapted to sum the output voltages and/or currents of the two arrangements.

Examples in accordance with another aspect of the invention provide a power generation method, comprising:

operating an electrical power generator, the generator comprising a first and second generating arrangement, each arrangement configured to generate an output voltage and/or current, and each using at least a first generating element and a second generating element, at least one of which is adapted to have a state of charging, and which are adapted to be moveable with respect to one another in order to generate a resultant output voltage and/or current, the output voltage and/or current being dependent upon a separation distance between the first and second generating element, wherein, the generating arrangements are co-operatively configured such that an increase in the separation distance between generating elements of the first arrangement results in a related decrease in the separation distance between generating elements of the second arrangement, and vice versa, wherein the method comprises:

inducing relative motion between the first and second generating element used by each of the first and second generating arrangements to thereby generate from each of the first and second generating arrangements a respective resultant output current and/or voltage; and combining the output voltages and/or currents of the first and second generating arrangements in order to generate a resultant combined electrical output signal from the electrical power generator. In the proposed invention, this combined electrical output provides a self-regulated constant output over a small separation distance between the generating elements of both arrangements.

In examples, the electrical power generator may comprise a first, second and third generating member, at least the third configured to be moveable with respect to the first and second, and wherein the first generating member comprises the first generating element of the first generating arrangement, the second generating member comprises the first generating element of the second generating arrangement, and the third generating member comprises the second generating elements of both the first generating arrangement and the second generating arrangement, the method further comprising:

controlling the position of the third generating member relative to the first and second so as to move it cyclically back and forth between the first and the second members.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a power generation device comprising at least two generating arrangements, each adapted to generate a voltage output through the relative motion of two equally or differently charged generating elements, the generating elements having some separation distance (which may be zero or non-zero). The arrangements are co-operatively configured in such a way that the separation distances between their respective elements are reciprocally related: an increase in one leads to a related decrease in the other. By combining these two signal outputs, a single current or voltage output may be provided by the device whose amplitude is substantially independent of any changes or variations in the separation distance between elements of either of the two arrangements.

As explained above, the peak power or voltage of the output generated by an electrostatic induction based generator (e.g. a TEG generator) is strongly related to the separation distance between its two relatively moving plate elements. Any variations in this separation distance therefore cause fluctuations in the generated output. Embodiments of the present invention propose a solution, whereby the outputs of two different generating arrangements are combined to form a single signal or power output, the two arrangements being mechanically configured such that their separation distances are reciprocally linked. The coupled contributions of the two independent voltages and/or currents therefore sum to a relatively constant value which does not change (or changes only minimally) in response to variations in generator plate separation distances.

According to one particular set of example embodiments, the power generating arrangements are comprised by or constitute one or more triboelectric power generators. These are characterised in that the relative charge between first and second sets of generating elements of each generating arrangement is established and maintained by means of intermittent periods of physical contact, during which reciprocal charge is built up on the elements of each set (a process of tribo-charging). These embodiments require that the generating elements be composed of materials which are triboelectrically active (which form part of the 'triboelectric series').

A variety of example embodiments incorporating triboelectric-based generator arrangements in particular will now be described in detail, by way of illustration of the principles of the invention. However, it should be understood that the concepts illustrated by these examples are not limited to particular application to triboelectric-based systems, but in fact may apply to any of a range of particular power generator arrangements. Such generators might include in general any electrical power generator which operates through the relative motion of two or more charged elements, including for example induction-based generators which generate electrical power through electrostatic induction but which do not operate through tribo-charging of mutually moving elements, or electret material based generators, or generators onto which surface charges are transferred or surface charge being activated from an external charge source (e.g. a charge gun). In each described embodiment, it should be understood that a provided triboelectric-based generator may be equally well replaced by a different variety of generator, without undermining the key advantages conferred by the described arrangement over existing state of the art devices.

Figure 3:
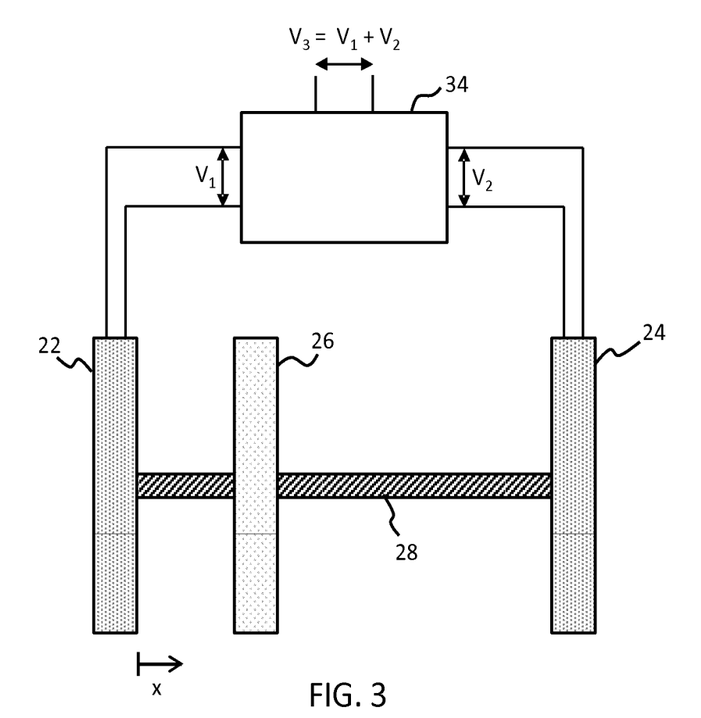
FIG. 3 schematically depicts a first example generator device.

FIG. 3 shows a first simple example device in accordance with embodiments of the invention. The device comprises a triple-plate rotating-disk TEG configuration, having a first disk plate 22, a second disk plate 24, and a third disk plate 26, all mounted to a central axle 28 which links the three together. The third disk plate 26 is disposed between the first 22 and second 24 and is configured to be movable along the length of the axle 28 between the first and second plates. In the particular example depicted, the first and second plates comprise first and second TEG stator plates, and the third plate comprises a TEG rotor plate. However, it should be understood that in alternative examples, the first and second plates may instead comprise two rotor plates, and the third plate comprise a single stator plate.

The first 22 and third 26 plates comprise, disposed on their opposing surfaces, co-operative arrangements or patterns of triboelectric material portions or triboelectric electrodes (not shown), these forming a first generating element and a second generating element of a first generating arrangement. The second 24 and third 26 plates also comprise, disposed on their respective opposing surfaces, co-operative arrangements or patterns of triboelectric material portions or triboelectric electrodes (not shown), these forming a first generating element and a second generating element of a second generating arrangement. The rotor plate 26 hence comprises two sets of triboelectric material sections (or triboelectric electrodes); one disposed on each of its major planar surfaces.

Upon rotation of the rotor disk 26 the relative motion with respect to the electrode pattern of the first stator plate 22 generates a first output signal, having a first voltage $V_1$. Simultaneously, the relative motion of the rotor 26 with respect to the electrode pattern of the second stator plate 24 generates a second output signal, of a second voltage $V_2$. A combiner unit 34 combines (or sums) the two output signals to form a third resultant output signal having a voltage $V_3$, equal to the sum of the two component output voltages $V_1$ and $V_2$. Note that the same principle may be applied for output currents as for output voltages.

As the rotor plate 26 moves back or forth along the axle 28 the respective separation distances with respect to the first 22 and second 24 stators change reciprocally, with any increase in one resulting in an exactly equal decrease in the other. These changes in separation distance result in equivalently reciprocal changes in the generated output voltages $V_1$ and $V_2$.

Figure 4:
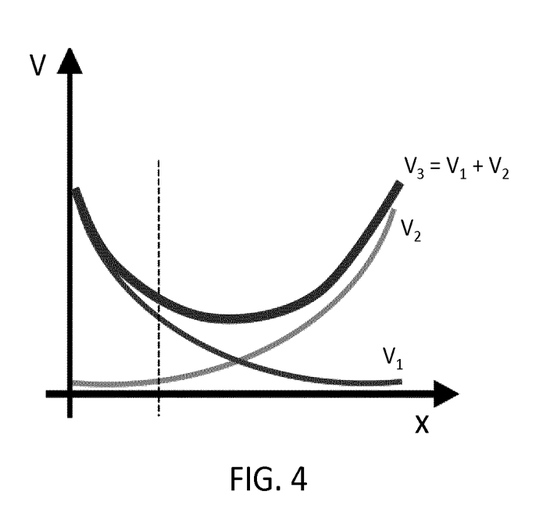
FIG. 4 shows a schematic representing voltage outputs as a function of plate separation distance of the different generating arrangements of the first example device.

FIG. 4 shows a graph illustrating these variations in voltage output V as a function of rotor plate 26 displacement x along the axle 28. The resultant combined output $V_3$ generated by the combiner unit is also shown. As can be seen, the combined output is not completely uniform over the entire width of the arrangement, but rather dips as the rotor is moved away from the first stator 22, reaching a low at the centre point between the two stators, before rising up again as the rotor approaches the second stator 24. If correctly designed (e.g. by choosing appropriate materials and number of rotational segments), constant power output can be achieved over a small separation distance change. Realistic values are about 0.5-1 mm in the power generation mode, where this is assumed to constitute >95% of the operation time of the herein described generators.

Although the combined output is in most cases not completely uniform, it nonetheless represents a significant improvement in uniformity compared to, for example, the outputs of either of the first or second generating arrangements on their own. In particular, the combined output signal $V_3$ provides an output which varies symmetrically across the total separation between the first 22 and second 24 stators, and which at no point tails to a near-zero value. As a result, the combined signal provides a much more reliable output for driving external electrical components, since the plate separation may be varied—either deliberately or in response to background or environmental factors—without the driving output ever dropping to a critically low level (i.e. a level at which it is no longer possible to drive the given component, leading to component failure).

Such a TEG device with self-compensating power output has several practical advantages over a conventional rotating disk TEG configuration. In particular, the generated power (or voltage) is less critically sensitive to rotor-stator misalignments due for example to assembly errors or manufacturing intolerances (e.g. flatness, roughness). The TEG device configuration is more robust (with respect to power output) to 'larger' rotor-stator separation distance variations, i.e. the plates of the generator can be varied to a much wider extent, without critically undermining the resultant power output.

In a TEG with self-compensating output power (as in embodiments of the present invention), there is less need for additional complex control electronics to maximise power output or to achieve constant (or near-constant) output power: the triple plate device represents a purely mechanical solution which may be implemented with minimal additional power conversion electronics. Moreover, one can operate the device in a non-contact mode and initiate either periodic or intermittent tribocharging without the need for a spiral groove pattern on one of the generator surfaces. Also, one can allow relative movement of rotor or stator during operation of the TEG. In practice such relative movement often occurs due to bearing play. One can exploit this bearing play and use it ensure tribocharging.

The configuration allows for the device to be operated in an intermittent contact-mode without significant fluctuation in output voltage or power. The rotor 26 may be moved along the axle 28 to bring it into contact with either the first 22 or second 24 stator for tribo-charging without the output of the device dropping to a critically low level.

There will now be described in detail a number of particular embodiments of self-compensating generator devices which each operate in accordance with the principles embodied by the simple example device of FIG. 3.

According to a first set of these embodiments, a triple plate TEG device is provided comprising two stators and a single rotor, wherein the stators are comprised by, or are imprinted upon, mechanical bearings or surfaces of mechanical bearings. The rotor, disposed movably between the two, is coupled by means of a carrier to one or more sources of external mechanical input. These inputs may be varying and non-uniform, such that there induced largely random or irregular motion of the rotor relative to the two stators. This semi-random external force may be conveniently utilised in examples to push the rotor (at intermittent points) onto one or both of the stators, thereby inducing tribo-charging between the two. The self-compensating nature of the device means that the consequent volatile variation in stator-rotor separation distances does not significantly affect the magnitude of the power output generated by the device because of the power self-regulation provided by a second generator arrangement. In such an operation mode, the external mechanical inputs may even be efficiently utilised to induce phases of tribo-charging, but without this incurring a consequent deterioration in the electrical output of the device.

By way of illustration FIGS. 5a and 5b show a simple first example of such an embodiment. The device comprises a first bearing 42 and a second bearing 44, the bearings comprising on their lower and upper surfaces respectively imprinted patterns of triboelectric material portions, or triboelectric electrodes. The bearings with imprinted electrode patterns provide effective first and second stator plate elements. Mounted to an axle or shaft 46, extending perpendicularly through the top of the first bearing 42, is a rotor element 48, the shaft 46 disposing the rotor in the space in between the two stator bearings 42, 44. The shaft is configured such that it comprises some freedom of movement along the direction of its longitudinal axis. In particular, the shaft may be adapted to move in response to the application of a loading force 54 applied to its upper end. Loading of the shaft causes the shaft to shift downwards slightly in response, bringing the mounted rotor element 48 with it as it does so. In this way, the position of the rotor 48 relative to the first 42 and second 44 bearings is varied.

Furthermore, a compression spring 52 provided to the axle 46 provides a mechanical retraction mechanism. The spring applies a force along the longitudinal axis of the shaft 46 of a magnitude such that, in the absence of external loading of the shaft, the rotor 48 is held resting against the surface of the first bearing 42. Tribo-charging of the rotor 48 and first bearing (or stator element) 42 in this case follows. Upon application of a loading force to the end of the shaft 46 (see FIG. 5b), work is done against the spring 52 and the shaft 46 is displaced downward through the centre of the arrangement 40. This induces a consequent displacement of the coupled rotor element 48 pushing it away from contact with the first bearing 42, and, with a sufficiently large force applied, toward contact with the second bearing 44. Tribo-charging is then induced between the rotor element and the second bearing (or stator element) 44.

Relative rotation between the rotor 48 and each of the first 42 and second 44 bearings generates a respective voltage output from each, labelled $V_1$ and $V_2$ respectively. These outputs are then combined to provide a single resultant output, formed of a sum of the two component signals, which is substantially uniform in terms of power and voltage, regardless of the particular positioning of the rotor 48 with respect to the stators 42, 44.

As indicated in FIG. 5a, when the rotor 48 moves closer to the first 42 bearing, voltage $V_1$ increases, while voltage $V_2$ decreases in a proportionate manner. As a result, the combined output from the two $(V_1+V_2)$ remains relatively constant. As shown in FIG. 5b, when the rotor 48 approaches closer to the second bearing 44, the voltage $V_1$ decreases, while the voltage $V_2$ in a proportionate manner. Again, this results in a relatively constant combined output $V_1+V_2$.

By fine-tuning the particular degree of freedom of the shaft 46 and providing springs 52 having suitable spring constants, intermittent tribo-charging of the plate elements may be ensured. Where the shaft mechanically is coupled with a source of variable and non-uniform mechanical loading, this external force may be utilised for inducing frequent (through irregular) intermittent tribo-charging of plate elements.

This TEG configuration 40 may find particularly advantageous application for example in cases where the TEG needs to be integrated within a small space, and alignment errors during assembly are likely to occur.

One particular application for instance might be as an energy harvesting or conversion system provided within an electric shaver device, or any other (handheld) device having a functional mechanical driving unit (e.g. a cutter unit in shavers) with an axle and spring supported bearing. An example of such an embodiment is shown for illustration in FIGS. 6a and 6b.

The device of FIGS. 5a and 5b is mounted within the body 62 of a shaver unit 60, with the bearing shaft 46 mechanically coupled at its upper end to a shaver head element 64, the head element comprising a rotary cutter and protective metal cap (cross-section of both indicated by 66) and a dedicated 'contour-following unit'. The shaft 46 is coupled at its lower end to a shaver motor unit 68, by means of which the shaft is rotated, thereby inducing rotation of both the rotary cutting element 66 and also of the coupled TEG rotor plate 48.

Figure 6A:
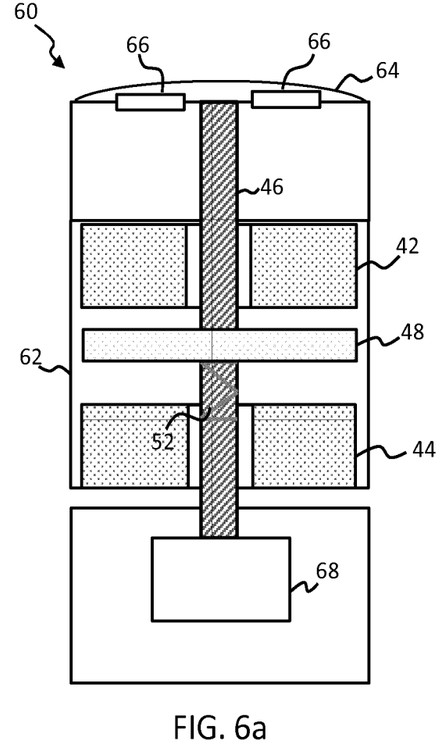
FIGS. 6a and 6b schematically depict an example electric shaver device incorporating the second example generator device.
Figure 6B:
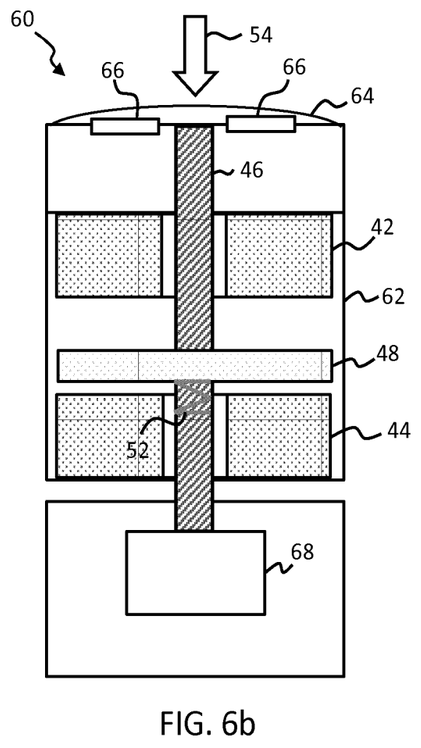

The contour-following unit is adapted to deflect at least in an up-and-down direction as it is moved across the surface of a user's skin, in order to adjust the orientation or positioning of the cutter to best match the contours of the user's face, and thereby provide a more effective and/or more comfortable cutting action (enhanced closeness of shave). These up and down deflections of the head element 64 are utilised in examples of the present embodiment to push the rotor 48 up and down between the first 42 and second 44 bearings (or stators), thereby inducing intermittent periods of contact, and therefore tribo-charging, with respect to the two, as well as a self-regulating power output as described in this invention.

Note that although for the purposes of the particular example application illustrated by FIGS. 6a and 6b, the variable mechanical input utilised by the device (the deflection of the shaver head unit 64 comprises a linear-type motion, in further examples, the harvested input may instead comprise any sort of mechanical input, including for instance rotation (e.g. from wind or water), or bending or sliding for example).

Furthermore, although in the particular example of FIGS. 5a and 5b (and FIGS. 6a and 6b), the device comprises a combination of rotating-disk type generator arrangements, utilising rotational bearings, in further examples, other varieties of TEG arrangement and bearing might alternatively be utilised, including for example tapping mode TEGs (using for instance sliding bearings).

Figure 7:
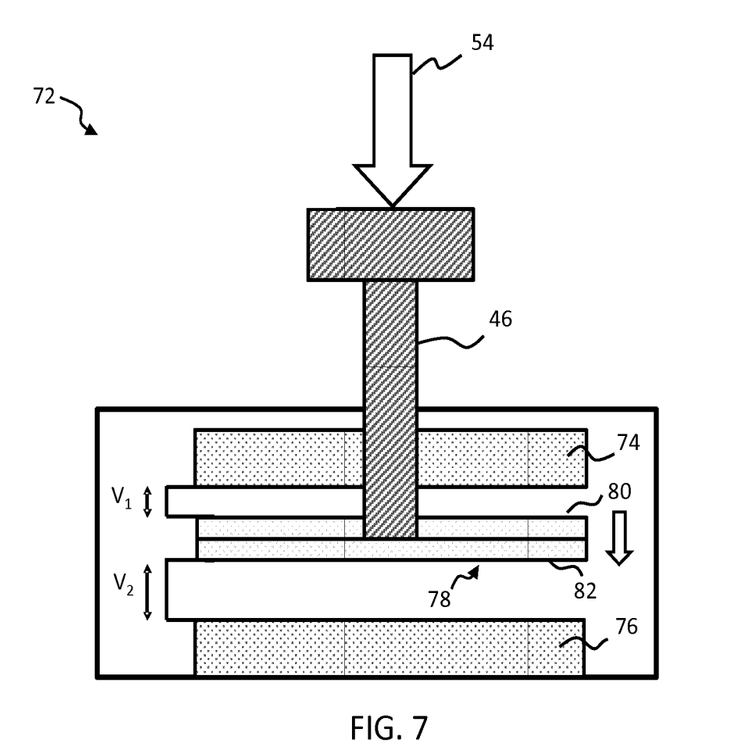
FIG. 7 schematically depicts a third example generator device.

One example of such an embodiment incorporating a combination of tapping mode (or vertical contact separation mode) TEG arrangements to provide an improved signal uniformity, self-compensating power output is depicted illustratively in FIG. 7. The provided device 72 comprises first static plate element 74 and second static plate element 76, the static plate elements comprising on their lower and upper surfaces respectively imprinted patterns of triboelectric material portions, or triboelectric electrodes. Mounted to one end of an axle or shaft 46, extending perpendicularly through the top of the first plate element 74, is a movable plate element 78, the shaft 46 disposing the moveable plate in the space in between the two static plates 74, 76. The moveable plate element 78 comprises on its upper 80 and lower surfaces 82 respective patterns of triboelectric material portions or triboelectric electrodes, arranged and adapted to couple with the patterns provided to the first 74 and second 76 static plates respectively, for generation of first and second output voltages ($V_1$ and $V_2$) in response to motion of the movable plate with respect to the static plates.

Application of a loading force 54 to the upper end of the shaft 46 induces displacement of the movable plate 78 in the direction of the second static plate element 76. Application of a force in the opposite direction or using the retraction force generated by a spring (not shown), induces a consequent displacement of the movable plate 78 in the direction of the first plate element 74. In some cases, a spring element might in addition be included, to provide a resistance against the downward application of external force, and stimulating return upward motion of the moving plate once any downward bias has been removed.

The relative (linear) motion between the moving plate 78 and the static plates 74, 76 induces a voltage or current between their respective electrode arrangements, generating a first output signal $V_1$ between the first static plate 74 and the moving plate 78, and a second output signal $V_2$ between the second static plate 76 and the moving plate 78. As in the previous examples, in operation (depending on the load resistance or when operated in an open circuit or short circuit condition), these two signals are combined to form a single summed resultant output signal $V_3$ which remains substantially constant/uniform regardless of the position of the moving plate 78 relative to either of the static plates 74, 76.

Figure 8:
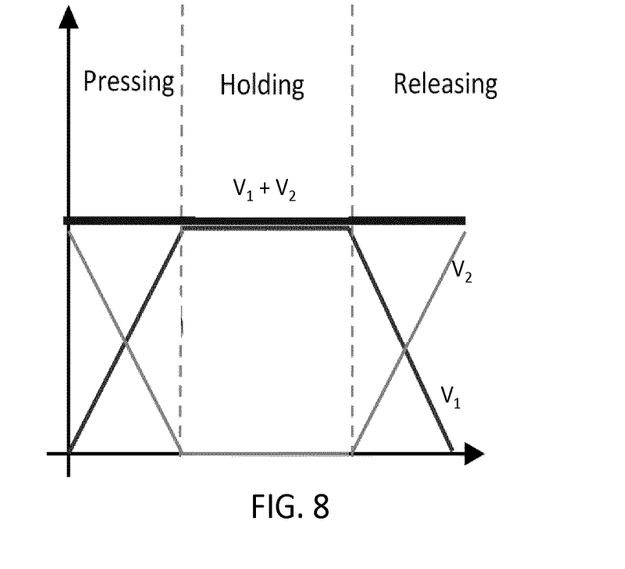
FIG. 8 shows a graph representing voltage outputs as a function of plate separation distance of the different generating arrangements of the third example device.

FIG. 8 shows a graph illustrating the variations in $V_1$ and $V_2$ as a function of displacement x of the moveable plate element 78 with respect to the first static plate element 74. As can be seen, for this tapping-mode TEG example, the combined voltage output signal $V_3$ does remain substantially uniform for all positions of the moving plate across the arrangement. Voltage is generated once the plates are separated after initial surface charge has been built up. Compared to rotating disc TEGs (FIGS. 3-4, 5-6, 9-10), in open circuit condition, here constant voltage theoretically can be achieved over the full separation distance when the central movable plate element 78 is repeatedly touching first static plate element 74 and second static plate element 76.

Furthermore, the linear motion of the shaft 46 is further utilised within the example to induce intermittent tribo-charging phases between the plate elements. As loading force 54 is applied downward through the shaft 46, inducing downward displacement of the movable plate element 78, not only is this movement harnessed to generate the output signals $V_1$, $V_2$ by electrostatic induction, but the movement also acts to bring the moving plate element 78 into contact with the second static plate element 76, thereby causing a tribo-charging of the two electrodes disposed on the surfaces of the two plates 76, 78. Likewise, motion of the movable plate 78 in the opposite direction brings the moving plate into contact with the first static plate element 74, inducing an instance of tribo-charging of this plate element.

Each of the particular embodiments described above is characterised in that it utilises or harnesses semi-random, non-uniform external mechanical inputs to provide intermittent random tribo-charging events. The separation distance between plate elements at any given time is, in each, determined by the influence of external forces not under the direct control of elements of the device.

According to a second set of example embodiments, a triple plate TEG device is provided with self-compensating power output, wherein the separation between the various plates is precisely controlled by means of dedicated mechatronic control components. These embodiments allow, in examples, for continuous and periodic (or cyclical) motion of a rotor element back and forth between a first and second stator element. Such an arrangement provides greater control over both the tribo-charging of the plates (enabling a more even and consistent charging regime for example) and of the generated combined output voltage and/or current from the device.

Figure 9:
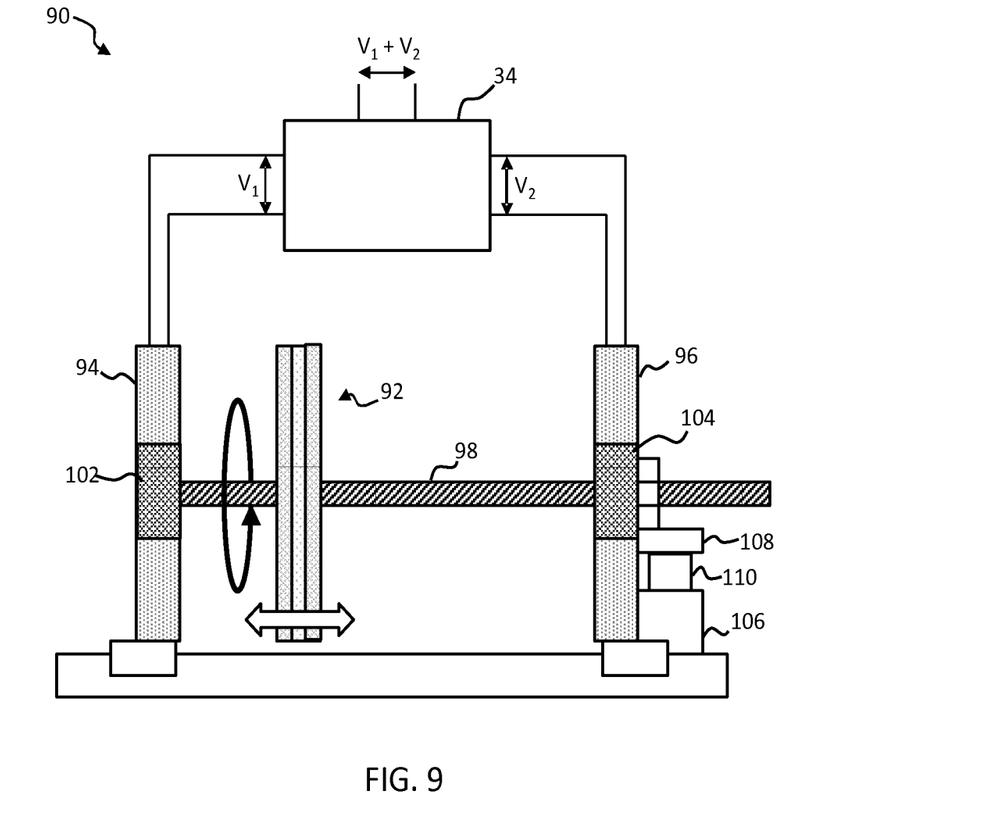
FIG. 9 schematically depicts a fourth example generator device.

A first example device in accordance with such an embodiment is illustrated in FIG. 9. The device 90 comprises a triple-plate rotating-disk TEG configuration, having a single rotor plate 92, and two stator plates 94, 96, the rotor plate disposed in-between the two stators, and coupled to a rotatable axle 98 which runs through the centre of all three plates. The first 94 and second 96 stators comprise rotational bearings 102, 104 which allow rotation of the axle 98, for driving rotation of the rotor disk 92. The axle 98 comprises a threaded rod or spindle whose rotation is driven by a stepper motor 106 (via a bevel gear 108) provided at one end of the TEG arrangement. The stepper motor 106 and axle 98 are configured such that rotation of the axle by the stepper motor induces a smooth linear displacement of the axle along directions of its longitudinal axis, the fine threading of the rod (for example trapezoidal threading) allowing for precise control by the motor over the extent of this displacement. By reversing the direction of the motor, the direction of the displacement may be changed.

As the motor 106 is driven, the rotor 92, coupled to the axle, not only rotates in correspondence with the rotation of the axle 98, but is also linearly displaced in concert with the linear displacement of the axle. Hence, as the motor 106 is driven, the rotor element 92 is displaced in a continuous fashion along the direction of the longitudinal axis of the axle, between the first 94 and second 96 stators (or vice versa). This configuration allows for a precise control over the rotor-stator separation and a regulation of the generated power output depending on rotor stator separation distance.

In particular, the rotor 92 may be moved back and forth in a continuous, periodic way, touching each of the stators 94, 96 in turn. By changing the motor current polarity for example, this back-forth motion can be controlled and the direction of the rotor movement reversed when the rotor has touched the first or second stator, causing tribo-charging. A torque sensor 110, distance sensors and/or end switches stops may be provided and used to determine when the rotor 92 has reached the 'left' or 'right' end position.

The stepper motor 106 may in examples be controlled by a controller unit (not shown). The controller unit may for instance comprise circuitry or a processor configured to carry out control instructions autonomously. Alternatively, a control unit may incorporate user control elements to allow direct user control of the positioning of the rotor.

Electrical outputs $V_1$ and $V_2$ generated by the first and second stators respectively in response to the rotation of the rotor plate, are combined by means of a combiner unit 34 to form a single summed output signal $V_3$ which remains substantially uniform regardless of the particular position of the rotor relative to the two stators.

The combiner unit 34 may in some examples comprise two separate power conversion circuits, each one connected to the output of a different stator. The outputs of these two circuits may then be connected to the same single load (e.g. a capacitor). Thus the load receives power from both conversion circuits.

Note, that the rotating disk TEG of this example comprises an array pattern of two alternating electrodes on each stator. Such a configuration allows output voltages and/or currents to be generated across these alternating electrodes of the stator alone, rather than between electrodes of the rotor and stator. In this way, wiring of the rotor may be avoided. However, it should be understood that in other examples, currents may be generated between the rotor and stator plates, and wiring correspondingly provided to the rotor.

Figure 10:
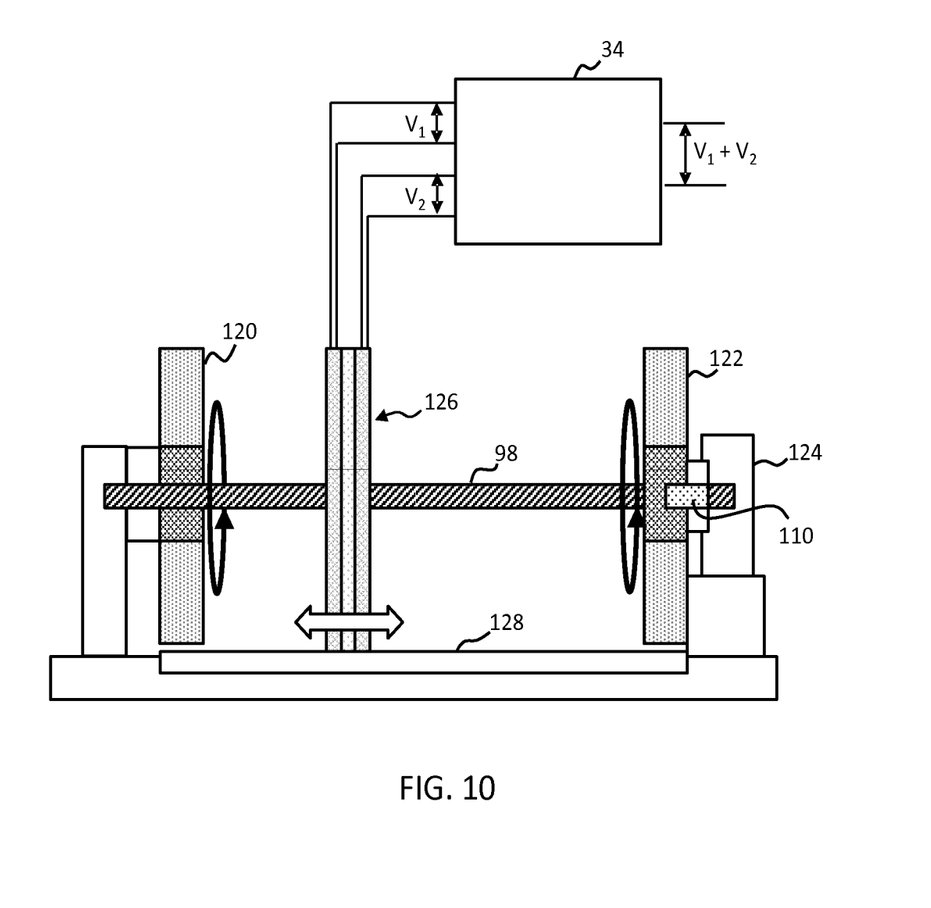
FIG. 10 schematically depicts a fifth example generator device.

Although in the example of FIG. 9, the device comprises two stator plates and a single rotor plate, in alternative examples, there may instead be provided two rotor plates and a single stator plate. One example of such an embodiment is shown in FIG. 10. Here, a first 120 and second 122 rotor plate are provided at either end of the arrangement, coupled to a central threaded axle 98 which drives rotation of the two rotors by means of a driving motor 124 provided at one end of the axle. A single stator 126 is also provided mounted on the threaded axle 98, and fixed on a sliding guide bearing 128 running beneath.

The sliding guide bearing 128 prevents rotation of the stator 126, but allows linear movement along the directions of the axle 98. The stator 126 is threadedly coupled to the axle 98. In virtue of this, since rotation of the stator is inhibited, any rotation of the axle induces a consequent 'threading' of the stator along the length of the axle, and hence a displacement of the stator back or forth between the two rotor elements 120, 122 depending upon the direction in which the motor 124 is being driven.

Hence, analogously to the example of FIG. 9, as the motor 124 is driven, the stator element 126 is displaced in a continuous fashion along the direction of the longitudinal axis of the axle 98, between the first 120 and second 122 rotors (or vice versa). This configuration allows for a precise control over the rotor-stator separation.

Again, this mechanism allows that the stator 126 may be moved back and forth in a continuous, periodic way, touching each of the rotors 120, 122 in turn. By changing the motor current polarity, this back-forth motion can be controlled and the direction of the stator movement reversed when the stator has touched the first or second rotor, causing tribo-charging. A torque sensor 110, distance sensors and/or end switches stops may be provided and used to determine when the stator 126 has reached the 'left' or 'right' end position.

In each of the examples described above, arrangements are provided in particular which comprise three generator plates; one plate disposed moveably between two others. Such a configuration is not essential to the concept of the invention however, and further alternative arrangements may instead be considered. For example, in some embodiments, each generating arrangement may make use of a separate pair of dedicated generator plates. A reciprocal relationship between the plate separation distances of these two arrangements may be realised by means of either a direct mechanical mechanism, or else through one or more forms of mechatronic regulation, controlled for example through automatic control electronics. A direct mechanical mechanism might include for instance one or more gearing mechanisms, configured such that motion of a first plate member induces a reciprocal motion in the second plate member.

Embodiments of this invention may be advantageously implemented in a wide range of particular applications, including in particular, within any products or devices which include moving parts (gears, shafts, bearings) from which mechanical energy may be harvested or converted. In particular, these may include, by way on non-limiting example only, handheld personal care devices (such as electric shavers, toothbrushes, skin care devices), kitchen appliances, floor care products (such as vacuum cleaners or floor polishers), polishing machines, or even large medical devices (such as X-ray tube bearings or CT scanner gantries), or rotating valves.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A power generation device, comprising:
an electrical power generator, the electrical power generator comprising a first generating arrangement and a second generating arrangement,
wherein each generating arrangement generates an output voltage and an output current,
wherein each generating arrangement uses a first generating element and a second generating element, at least one of the first generating element and the second generating element maintains a non-zero state of charge when the first generating element and the second generating element are separated from each other,
wherein the first generating arrangement is moveable with respect to the second generating arrangement,
wherein a movement of the first generating arrangement relative to the second generating arrangement generates an output voltage and an output current,
wherein the output voltage and/or the output current is dependent upon a separation distance between the first generating element and the second generating element of each generating arrangement and the non-zero state of charge,
wherein the generating arrangements are arranged such that an increase in the separation distance between generating elements of the first arrangement results in a related decrease in the separation distance between generating elements of the second arrangement, and vice versa, and
wherein the electrical power generator further comprises a combiner unit that combines the output voltages and output currents of the first generating arrangement and the second generating arrangement.

2. The device of claim 1,
wherein the electrical power generator comprises a first generating member, a second generating member and a third generating member,
wherein at least the third generating member is moveable with respect to the first generating member and the second generating member,
wherein the first generating member comprises the first generating element of the first generating arrangement, wherein the second generating member comprises the first generating element of the second generating arrangement, and wherein the third generating member comprises the second generating elements of both the first generating arrangement and the second generating arrangement.

3. The device of claim 2, wherein the third generating member is positioned between the first generating member and the second generating member, and wherein the third generating member is arranged to be moveable along an axis running between the first generating member and the second generating member.

4. The device of claim 3, wherein the position of the third generating member along the axis is controlled in dependence upon the application of an external force.

5. The device of claim 3, wherein the third generating member is coupled to a carrier, wherein the carrier is displaceable along the directions of the axis, and wherein the third member is allowed to move along the axis.

6. The device of claim 5, wherein the displacement of the carrier is biased in one direction along the axis.

7. The device of claim 3, wherein the device further comprises a controller unit, and wherein the controller unit controls the position of the third generating member along the axis.

8. The device of claim 7, wherein the controller cyclically moves the third generating member back and forth between the first generating member and the second generating member.

9. The device claim 7, wherein the controller induces intermittent periods of contact between the third generating member and the first generating member and/or second generating member, and wherein the intermittent periods of contact induce contact between the first generating element and the second generating element of the first generating arrangement and/or the second generating arrangement.

10. The device of claim 2, wherein first generating member, the second generating member and the third generating member comprise respective disk elements, and wherein the third generating member is rotatable with respect to the first generating member and the second generating member.

11. The device of claim 2, wherein the electrical power generator is a three-element generator (TEG) comprising rotating discs.

12. The device of claim 11, wherein the TEG comprises at least one stator and at least one rotor, and wherein a configuration of the TEG is one of:
the first and second members comprising the stators of the TEG and the third member comprising the rotor of the TEG, or
the first and second members comprising the rotors of the TEG and the third member comprising the stator of the TEG.

13. The device of claim 1, wherein the generating elements of each of the first generating arrangement and the second generating arrangement each comprise respective sets of one or more chargeable surface regions.

14. The device of claim 1, wherein the power generator is a triboelectric power generator.

15. The device of claim 1, wherein the combiner unit sums the output voltages and/or currents of the first generating arrangement and the second generating arrangement.

16. A power generation method, comprising:

operating an electrical power generator, the electrical power generator comprising a first generating arrangement and a second generating arrangement, wherein each generating arrangement generates an output voltage and an output current, wherein each generating arrangement uses first generating element and a second generating element, at least one of the first generating element and the second generating element maintains a non-zero state of charge when the first generating element and second generating element are separated from each other, wherein the first generating arrangement is moveable with respect to the second generating arrangement, wherein a movement of the first generating arrangement relative to the second generating arrangement generates an output voltage and an output current, wherein the output voltage and/or current is dependent upon a separation distance between the first generating element and the second generating element of each generating arrangement and the non-zero state of charge, wherein, the generating arrangements are arranged such that an increase in the separation distance between generating elements of the first arrangement results in a related decrease in the separation distance between generating elements of the second arrangement, and vice versa, the method comprising:

inducing relative motion between the first generating element and the second generating element used by each of the first generating arrangement and the second generating arrangement, wherein each of the first generating arrangement and the second generating arrangement generates the respective output voltage and the output current; and combining the output voltages and the output currents of the first generating arrangement and the second generating arrangement.

17. The method claim 16, wherein the electrical power generator comprises a first generating member, a second generating member and a third generating member, wherein at least the third generating member is moveable with respect to the first generating member and the second generating member, wherein the first generating member comprises the first generating element of the first generating arrangement, wherein the second generating member comprises the first generating element of the second generating arrangement, and wherein the third generating member comprises the second generating elements of both the first generating arrangement and the second generating arrangement, the method further comprising:

moving the third generating member cyclically back and forth between the first generating member and the second generating member.

18. The method of claim 17, wherein the third generating member is arranged to be moveable along an axis running between the first generating member and the second generating member.

19. The method claim 18, wherein the position of the third generating member along the axis is controlled in dependence upon the application of an external force.

20. The method of claim 18, wherein the movement of the third generating member is biased in one direction along the axis.

21. The method of claim 20,
wherein a controller induces intermittent periods of contact between the third generating member and the first generating member and/or second generating member, and
wherein the intermittent periods of contact induce contact between the first generating element and the second generating element of the first generating arrangement and/or the second generating arrangement.

22. The method of claim 20, wherein the bias is caused by a spring.

23. The method of claim 17, wherein the electrical power generator is a three-element generator (TEG) comprising rotating discs.

24. The method of claim 23, wherein the TEG comprises at least one stator and at least one rotor, and
wherein a configuration of the TEG is one of:
the first and second members comprising the stators of the TEG and the third member comprising the rotor of the TEG, or
the first and second members comprising the rotors of the TEG and the third member comprising the stator of the TEG.

* * * * *